(12) United States Patent
Fattal et al.

(10) Patent No.: US 11,143,811 B2
(45) Date of Patent: Oct. 12, 2021

(54) MULTIVIEW BACKLIGHTING EMPLOYING FLUORESCENT MULTIBEAM ELEMENTS

(71) Applicant: LEIA INC., Menlo Park, CA (US)

(72) Inventors: David A. Fattal, Mountain View, CA (US); Ming Ma, Palo Alto, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/447,901

(22) Filed: Jun. 20, 2019

(65) Prior Publication Data

US 2019/0302336 A1 Oct. 3, 2019

Related U.S. Application Data

(63) Continuation of application No. PCT/US2016/069005, filed on Dec. 28, 2016.

(51) Int. Cl.
*F21V 8/00* (2006.01)

(52) U.S. Cl.
CPC .................... *G02B 6/005* (2013.01)

(58) Field of Classification Search
CPC ..... G02B 6/005; G02B 6/0035–6/0036; G02B 30/33; H04N 13/32; H04N 13/351
USPC .............. 362/606–607, 617–619; 349/65, 71
See application file for complete search history.

(56) References Cited

U.S. PATENT DOCUMENTS

| 5,410,345 A | * | 4/1995 | Eichenlaub | ........ | G02B 27/0093 |
| | | | | | 348/59 |
| 7,278,756 B2 | * | 10/2007 | Leu | ...................... | G02B 6/0023 |
| | | | | | 257/100 |
| 8,023,072 B2 | | 9/2011 | Tsubata et al. | | |

(Continued)

FOREIGN PATENT DOCUMENTS

| EP | 2802148 A1 | 11/2014 |
| GB | 2405543 A | 3/2005 |

(Continued)

OTHER PUBLICATIONS

International Search Report and Written Opinion (ISRWO) by International Searching Authority (ISA) Korean Intellectual Property Office (KIPO) dated Aug. 18, 2017 (11 pages) for counterpart PCT Application PCT/US2016/069005.

(Continued)

*Primary Examiner* — Jason M Han
(74) *Attorney, Agent, or Firm* — J. Michael Johnson

(57) ABSTRACT

Multiview backlighting employs a fluorescent multibeam element having a color-tailored emission pattern to provide directional light beams corresponding to a plurality of different views of a multiview image. A multiview backlight includes a light guide configured to guide light as guided light and a fluorescent multibeam element. The fluorescent multibeam element includes a fluorescent material and is configured to provide emitted light having a color-tailor emission pattern from the guided light. The emitted light includes a plurality of directional light beams having different principal angular directions corresponding to respective different view directions of a multiview display and the color-tailored emission pattern corresponds to an arrangement of color sub-pixels of a view pixel in the multiview display.

25 Claims, 7 Drawing Sheets

(56) References Cited

U.S. PATENT DOCUMENTS

| | | | |
|---|---|---|---|
| 8,459,855 B2* | 6/2013 | Anandan | G02F 1/133606 362/606 |
| 9,201,270 B2 | 12/2015 | Fattal et al. | |
| 9,557,466 B2 | 1/2017 | Fattal | |
| 2005/0117320 A1* | 6/2005 | Leu | H01L 33/508 362/612 |
| 2007/0258140 A1 | 11/2007 | Shestak et al. | |
| 2011/0176328 A1* | 7/2011 | Anandan | G02F 1/133605 362/606 |
| 2011/0310233 A1 | 12/2011 | Bathiche et al. | |
| 2012/0002295 A1 | 1/2012 | Dobschal et al. | |
| 2012/0127751 A1 | 5/2012 | Kimmel | |
| 2012/0195072 A1 | 8/2012 | Minami | |
| 2013/0088891 A1 | 4/2013 | Minami | |
| 2013/0169694 A1 | 7/2013 | Chen et al. | |
| 2013/0321406 A1 | 12/2013 | Harrold et al. | |
| 2014/0285642 A1 | 9/2014 | Hwang et al. | |
| 2014/0292758 A1 | 10/2014 | Nam et al. | |
| 2015/0016777 A1 | 1/2015 | Abovitz et al. | |
| 2015/0036068 A1 | 2/2015 | Fattal et al. | |
| 2016/0065955 A1 | 3/2016 | Kim et al. | |
| 2016/0265749 A1 | 9/2016 | Inada | |
| 2016/0320620 A1 | 11/2016 | Maimone | |
| 2017/0363794 A1 | 12/2017 | Wan et al. | |
| 2018/0011237 A1 | 1/2018 | Fattal | |
| 2018/0106938 A1 | 4/2018 | Han et al. | |
| 2018/0188441 A1 | 7/2018 | Fattal | |
| 2018/0188691 A1 | 7/2018 | Fattal | |
| 2018/0196194 A1 | 7/2018 | Fattal | |
| 2018/0299608 A1 | 10/2018 | Fattal et al. | |
| 2019/0025494 A1 | 1/2019 | Fattal et al. | |
| 2019/0155105 A1 | 5/2019 | Aieta et al. | |

FOREIGN PATENT DOCUMENTS

| | | |
|---|---|---|
| JP | 2006039137 A | 2/2006 |
| TW | I547740 B | 9/2016 |
| WO | 2012038856 A1 | 3/2012 |
| WO | 2014051623 A1 | 4/2014 |
| WO | 2014081415 A1 | 5/2014 |
| WO | 2016182549 A1 | 11/2016 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

* cited by examiner

MULTIVIEW BACKLIGHTING EMPLOYING FLUORESCENT MULTIBEAM ELEMENTS

CROSS-REFERENCE TO RELATED APPLICATIONS

This application is a continuation patent application of and claims the benefit of priority to International Application No. PCT/US2016/069005, filed Dec. 28, 2016, which is incorporated by reference herein in its entirety.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is located behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
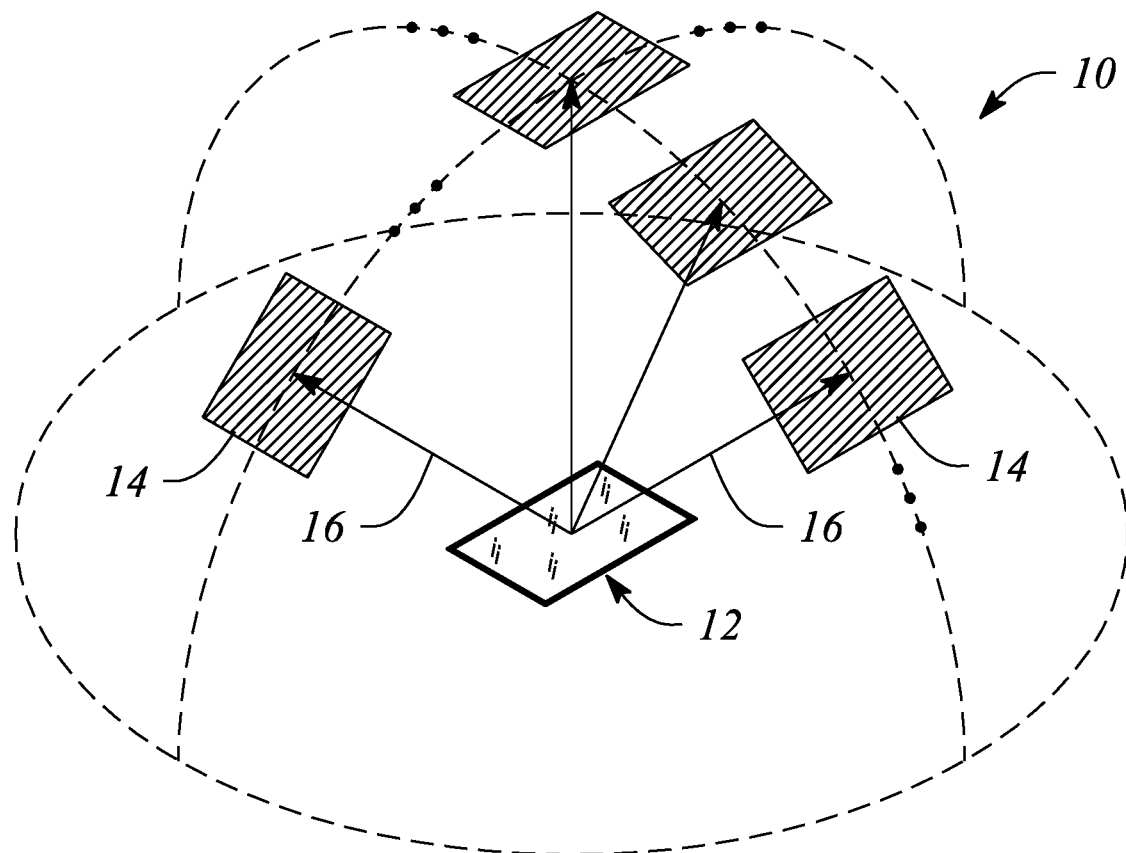
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide multiview backlighting that employs a fluorescent multibeam element. In particular, multiview backlighting embodiments described herein may include a multibeam element comprising a fluorescent material, i.e., a 'fluorescent' multibeam element. According to various embodiments, the fluorescent multibeam element may be configured to provide emitted light comprising light beams having a plurality of different principal angular directions. The different principal angular directions of the light beams may correspond to different directions of various different views of a multiview display, for example. Further, the light emitted by the fluorescent multibeam element has a color-tailored emission pattern (or a color-tailored 'fluorescent' emission pattern) and the light beams include different colors of light consistent with that emission pattern, according to various embodiments.

As such, the multiview backlighting employing the fluorescent multibeam element may be configured to provide color backlighting with particular application to color multiview displays. In some embodiments, the color-tailored emission pattern of the fluorescent multibeam element may mitigate, compensate for, or even substantially eliminate various effects associated with color backlighting of color multiview displays including, but not limited to, color break-up. Uses of color multiview displays employing the multiview backlighting using the fluorescent multibeam element include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Embodiments consistent with the principles described herein provide a multiview backlight (e.g., of a multiview display) having a fluorescent multibeam element (e.g., a plurality or array of fluorescent multibeam elements). According to various embodiments, the fluorescent multibeam element is configured to provide a plurality of light beams. The plurality of light beams includes one or more light beams having different principal angular directions from other light beams of the light beam plurality. As such, the light beams of the light beam plurality may be referred to as 'directional' light beams of a plurality of directional light beams. The different principal angular directions of the directional light beams may correspond to angular directions associated with a spatial arrangement of pixels, or 'view pixels,' in a multiview pixel of a multiview display, according to some embodiments.

Further, the fluorescent multibeam elements of the multiview backlight are configured to provide emitted light comprising light beams that have, include or represent a plurality of different colors of light. For example, the light beam plurality may include light beams representing different colors such as, but not limited to, red (R), green (G), and blue (B) of an RGB color model. The color-tailored emission pattern of the fluorescent multibeam element is configured to provide sets of the different color light beams having substantially similar principal angular directions. For example, the color-tailored emission pattern of the fluorescent multibeam element may provide a set of light beams including light beams of several different colors (e.g., R, G, B) that all have substantially the same principal angular direction that, in turn, corresponds to a direction of one of the view pixels of the multiview display. Another set of different color light beams (e.g., also including R, G, B light beams) provided by the color-tailored emission pattern of the fluorescent multibeam element may have substantially similar principal angular directions corresponding to a direction of a different one of the view pixels. As such, the color-tailored emission pattern of the fluorescent multibeam element may facilitate providing or illuminating each of the view pixels of the multiview pixel with a set of different colors of light (e.g., red, green and blue), according to various embodiments. Further, as is described in more detail below, the color-tailored emission pattern of the fluorescent multibeam element may be configured to mitigate or even substantially compensate for various effects such as color-break up that, for example, may be associated with a finite size of the fluorescent multibeam element.

As mentioned above, the fluorescent multibeam element comprises a fluorescent material. Herein, a 'fluorescent' material is defined as a material comprising phosphors that emit light (e.g., by fluorescence) when illuminated by an incident light source or similar stimulus. As such, the fluorescent material may be substantially any fluorescent or phosphorescent material that contains phosphors. For example, the fluorescent material may include a plurality of different fluorescent pigments in which different fluorescent pigments have different fluorescent emission colors, respectively. In another example, the fluorescent material may comprise a plurality of fluorescent quantum dots. In particular, the plurality of fluorescent quantum dots may include different types (e.g., different sizes) of fluorescent quantum dots having respective different colors of fluorescent emission (i.e., different fluorescent emission colors). In yet other examples another fluorescent material (e.g., an organic polymer, a semiconductor, etc.) of different color types may be employed. In these various and non-limiting examples, the different types of fluorescent pigments, fluorescent quantum dots, or other fluorescent materials may be physically arranged, distributed, or spatially offset relative to one another to provide the color-tailored emission pattern. As such, the color-tailored emission pattern may be a result of an arrangement or structure of various different types of fluorescent emitters within the fluorescent material of the fluorescent multibeam element, according to various embodiments. Further, in some embodiments, the fluorescent material may act as a fluorescent source or more particularly a plurality of different fluorescent sources having or providing different colors of emitted light consistent with the color-tailored emission pattern.

According to various embodiments, a fluorescent material of the fluorescent multibeam element may emit light by fluorescence as the plurality of light beams of the different colors determined according to the color-tailored emission pattern. According to some embodiments, the fluorescent multibeam element may be divided into different zones that contain different types of fluorescent material. In particular, the fluorescent multibeam element may comprise a plurality of multibeam sub-elements comprising the different fluorescent material types and therefore exhibiting different fluorescent emission colors from one another, according to some embodiments. A distribution of the different zones or equivalently a distribution of different multibeam sub-elements with in the fluorescent multibeam element may define the color-tailored emission pattern. Further, according to various embodiments, the zones or multibeam sub-elements may be spatially offset from one another in a spatial arrangement corresponding to a spatial arrangement or spacing of color sub-portions or 'color sub-pixels' of view pixels in a multiview pixel of the multiview display. As such, herein the fluorescent multibeam element may be referred to as a 'composite' multibeam element due to the presence of spatially offset multibeam sub-elements containing the different fluorescent material types or emitters within the fluorescent multibeam element.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
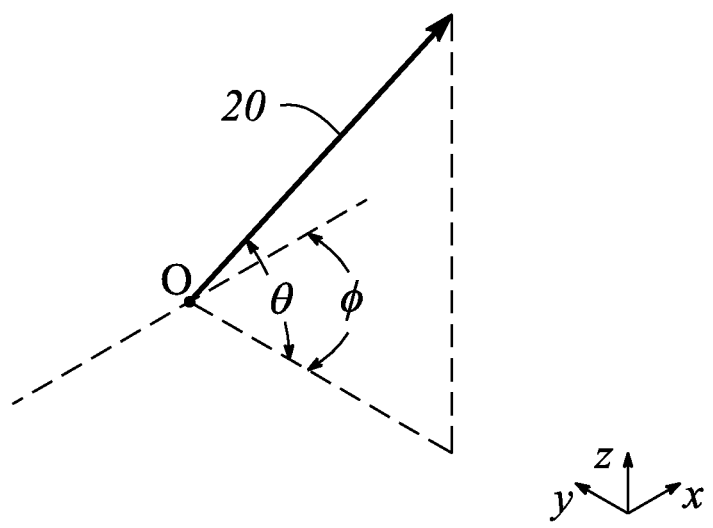
FIG. 1B illustrates a graphical representation of angular components of a light beam having a particular principal angular direction corresponding to a view direction of a multiview display in an example, according to an embodiment consistent with the principles described herein.

A 'view direction' or equivalently a light beam having a direction corresponding to a view direction of a multiview display (i.e., a directional light beam) generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O. The light beam 20 also represents a directional light beam, herein.

Further herein, the term 'multiview' as used in the terms 'multiview image' and 'multiview display' is defined as a plurality of views (e.g., images) representing different perspectives or including angular disparity between views of the view plurality. In addition, the term 'multiview' explicitly includes more than two different views (i.e., a minimum of three views and generally more than three views), by some definitions herein. As such, 'multiview display' as employed herein may be explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels or 'view pixels' representing image pixels in each of a similar plurality of different views of a multiview display. In particular, a multiview pixel has an individual view pixel corresponding to or representing an image pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to image pixels located at $\{x_1, y_1\}$ in each of the different views of a multiview image, while a second multiview pixel may have individual view pixels corresponding to image pixels located at $\{x_2, y_2\}$ in each of the different views, and so on.

In some embodiments, a number of view pixels in a multiview pixel may be equal to a number of views of the multiview display. For example, the multiview pixel may provide sixty-four (64) view pixels associated with a multiview display having 64 different views. In another example, the multiview display may provide an eight by four array of views (i.e., 32 views) and the multiview pixel may include thirty-two (32) view pixels (i.e., one for each view). In yet other examples, a number of views of the multiview display may range substantially anywhere from two or more views and be arranged in substantially any arrangement (e.g., rectangular, circular, etc.). As such, the view pixels in a multiview pixel may have both a similar number and similar arrangement to the number and the arrangement of the views of the multiview display, according to some embodiments. Additionally, each different view pixel generally has an associated direction (e.g., light beam principal angular direction) that corresponds to a different one of the view directions corresponding to the different views (e.g., 64 different views).

Further, according to some embodiments, a number of multiview pixels of the multiview display may be substantially equal to a number of pixels (i.e., pixels that make up a selected view) in the various individual views of the multiview display. For example, if a view includes six hundred forty by four hundred eighty pixels (i.e., the view has a 640×480 view resolution), the multiview display may have three hundred seven thousand two hundred (307,200) multiview pixels. In another example, when the views include one hundred by one hundred pixels, the multiview display may include a total of ten thousand (i.e., 100× 100=10,000) multiview pixels.

In some embodiments, the view pixels in or of a multiview pixel may include portions or sub-portions that correspond to different colors. For example, a view pixel in the multiview pixel may include different color sub-portions or equivalently 'color sub-pixels,' by definition herein, that correspond to or that are configured to provide different colors. The color sub-pixels may be light valves (e.g., liquid crystal cells) having particular color filters, for example. In general, a number of color sub-pixels in a multiview pixel is larger than the number of view pixels or equivalently the number of views of the multiview display. In particular, an individual view pixel may include a plurality of color sub-pixels corresponding to or representing the view pixel and having an associated common direction. That is, the color sub-pixels of the plurality collectively represent the view pixel and the view pixel, in turn, has a direction (e.g., a principal angular direction) corresponding to a view direction of a particular view of the multiview image or equivalently of the multiview display. Herein, a size Sofa view pixel is defined as a center-to-center spacing (or equivalently an edge-to-edge distance) between adjacent view pixels (see for example, FIGS. 2A, 3 and 5, described below). Also, by definition, a size of a color sub-pixel of or within a view pixel is smaller than the view pixel size S, e.g., a color sub-pixel may have size S/3 when there are three color sub-pixels in a view pixel of size S. Herein, the color sub-pixels may have a size defined either by a center-to-center or edge-to-edge distance between adjacent color sub-pixels within a view pixel.

Further, the color sub-pixels may be configured to provide modulated light having wavelengths or equivalently colors associated the colors of or in the multiview image. For example, a first color sub-pixel of the plurality of color sub-pixels may be configured to provide modulated light having a wavelength corresponding to a first primary color (e.g., red). Further, a second color sub-pixel of the plurality of color sub-pixels may be configured to provide modulated light corresponding to a second primary color (e.g., green), and a third color sub-pixel of the plurality of color sub-pixels may be configured to provide modulated light corresponding to a third primary color (e.g., blue). Note that while a red-blue-green (RGB) color model is used as an illustration in this discussion, other color models may be used, according to embodiments consistent with the principles described herein. Also, a view pixel of a multiview pixel may include multiple color sub-pixels, which, therefore, have a smaller size or have a smaller spatial extent than the view pixel, by definition herein.

Herein, a 'light guide' is defined as a structure that guides light within the structure using total internal reflection or 'TIR.' In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

By definition herein, a 'multibeam element' is a structure or element of a backlight or a display that produces light that includes a plurality of light beams. In some embodiments, the multibeam element may be optically coupled to a light guide of a backlight to provide the light beams by coupling out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality.

Further, by definition herein, a 'fluorescent multibeam element' is a multibeam element configured to emit light by fluorescence, the emitted light comprising the light beams having the different principal angular directions. For example, the fluorescent multibeam element may comprise a fluorescent material configured to absorb a portion of guided light and to emit light by fluorescence therefrom. As such, the portion of the light guided in the light guide that is coupled-out may comprise the light emitted by fluorescence.

Moreover, as described above, the light beams of the plurality of light beams produced by a fluorescent multibeam element may have the same or substantially the same principal angular direction for different colors corresponding to a spatial arrangement of color sub-pixels of a view pixel in a multiview pixel of a multiview display. These light beams provided by the multibeam element are referred to as emitted light having a 'color-tailored emission pattern.' Furthermore, the light beam plurality may represent a light field. For example, the light beam plurality may be confined to a substantially conical region of space or have a predetermined angular spread that includes the principal angular direction of the light beams in the light beam plurality. As such, the predetermined angular spread of the light beams in combination (i.e., the light beam plurality) may represent the light field. Moreover, the light field may represent a 'color' light field with different colors being represented within a set of conical regions of space having substantially the same predetermined angular spread.

According to various embodiments, the principal angular direction of the various light beams are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B. Further, a color of the various light beams may be determined by both the color-tailored emission pattern and a distribution of the color sub-pixels of the various view pixels, according to various embodiments.

Herein a 'collimator' is defined as substantially any optical device or apparatus that is configured to collimate light. For example, a collimator as defined may include, but is not limited to, a collimating mirror or reflector (i.e., a reflective collimator), a collimating lens, prismatic film, or similar refractive structure (i.e., a refractive collimator), or a diffraction grating (i.e., a diffractive collimator), as well as various combinations thereof. The collimator may comprise a continuous structure such as a continuous reflector or a continuous lens (i.e., a reflector or lens having a substantially smooth, continuous surface). In other embodiments, the collimator may comprise a substantially discontinuous structure or surface such as, but not limited to, a Fresnel reflector, a Fresnel lens and the like that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or characteristic in one or both of two orthogonal directions that provides light collimation, according to some embodiments.

Herein, a 'collimation factor' is defined as a degree to which light is collimated, e.g., by the collimator. In particular, a collimation factor defines an angular spread of light rays within a collimated beam of light, by definition herein. For example, a collimation factor $\sigma$ may specify that a majority of light rays in a beam of collimated light that is within a particular angular spread (e.g., +/−$\sigma$ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, a fluorescent source, a plasmonic resonator, a nanoparticle resonator, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. More generally, the light source may produce light having a shorter wavelength (higher frequency) than the wavelengths of light emitted by fluorescence of a fluorescent multibeam element. In some embodiments, the light source is monochromatic or substantially monochromatic, such as blue or ultraviolet light.

As used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
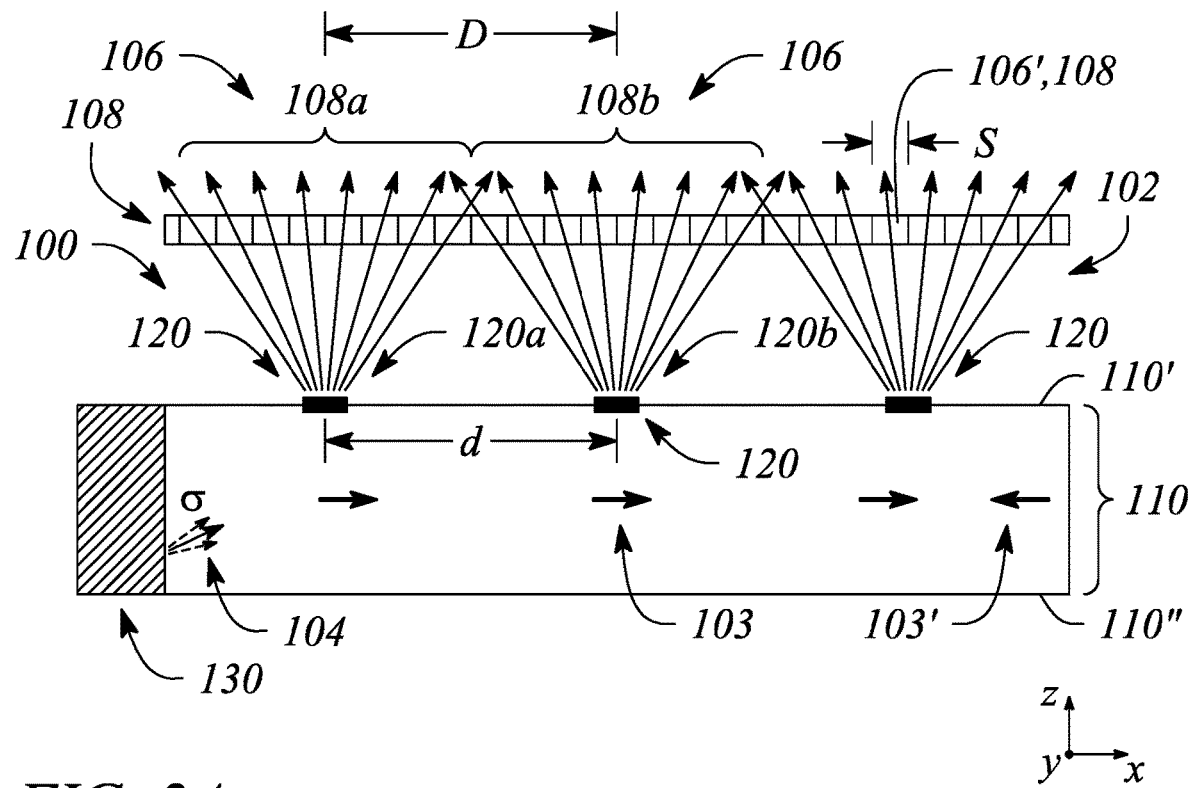
FIG. 2A illustrates a cross sectional view of a multiview backlight in an example, according to an embodiment consistent with the principles described herein.
Figure 2B:
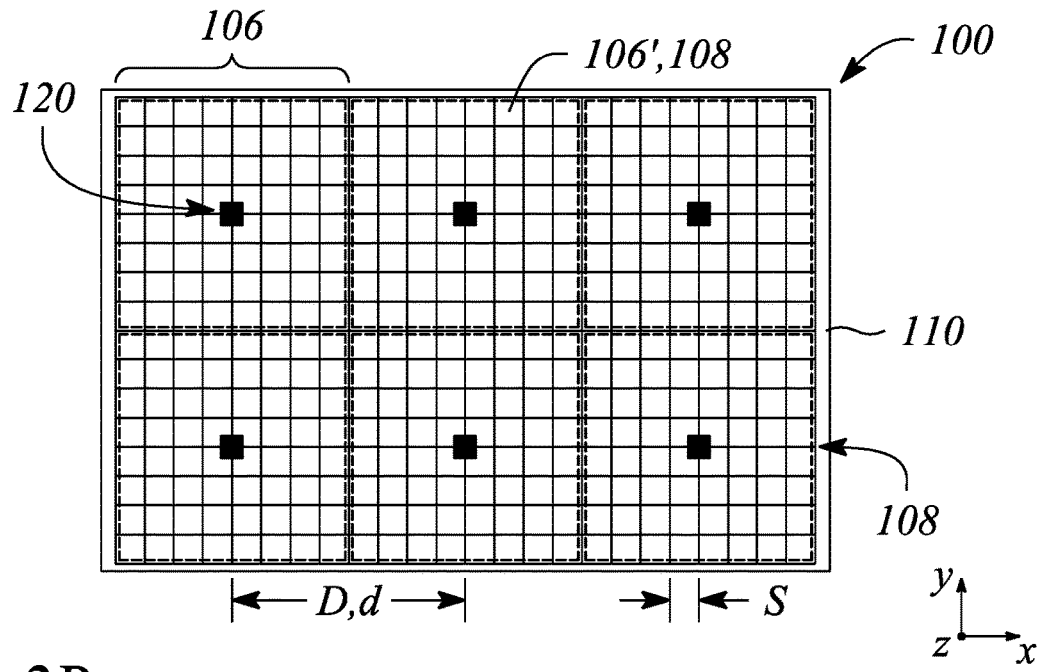
FIG. 2B illustrates a plan view of a multiview backlight in an example, according to an embodiment consistent with the principles described herein.
Figure 2C:
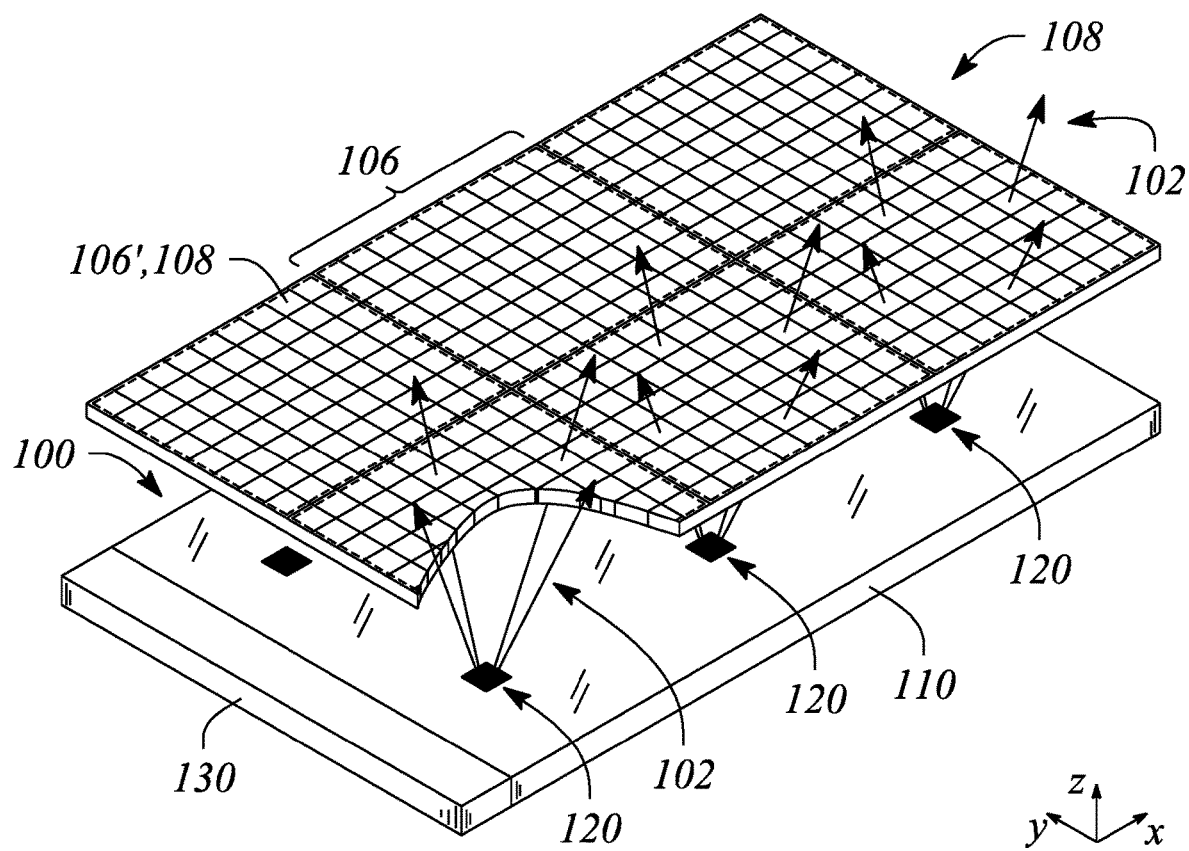
FIG. 2C illustrates a perspective view of a multiview backlight in an example, according to an embodiment consistent with the principles described herein.

According to some embodiments of the principles described herein, a multiview backlight is provided. FIG. 2A illustrates a cross sectional view of a multiview backlight 100 in an example, according to an embodiment consistent with the principles described herein. FIG. 2B illustrates a plan view of a multiview backlight 100 in an example, according to an embodiment consistent with the principles described herein. FIG. 2C illustrates a perspective view of a multiview backlight 100 in an example, according to an embodiment consistent with the principles described herein. The perspective view in FIG. 2C is illustrated with a partial cut-away to facilitate discussion herein only.

The multiview backlight 100 illustrated in FIGS. 2A-2C is configured to provide a plurality of coupled-out or directional light beams 102 having different principal angular directions from one another (e.g., as a light field). In particular, the provided plurality of directional light beams 102 are coupled or emitted out of and directed away from the multiview backlight 100 in different principal angular directions corresponding to respective view directions of a multiview display, according to various embodiments. In some embodiments, the directional light beams 102 may be modulated (e.g., using light valves, as described below) to facilitate the display of information having 3D content.

As illustrated in FIGS. 2A-2C, the multiview backlight 100 comprises a light guide 110. The light guide 110 may be a plate light guide 110, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light 104 using total internal reflection. According to various examples, the material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 propagates by reflecting or 'bouncing' between the first surface 110' and the second surface 110" of the light guide 110 at the non-zero propagation angle.

In some embodiments, the light guide 110 may be configured to 'recycle' the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as recycled guided light. Recycling guided light 104 in this manner may increase a brightness of the multiview backlight 100 (e.g., an intensity of the directional light beams 102) by making guided light available more than once, for example, to fluorescent multibeam elements, described below.

In FIG. 2A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103).

As illustrated in FIGS. 2A-2C, the multiview backlight 100 further comprises a fluorescent multibeam element 120. In particular, the multiview backlight 100 of FIGS. 2A-2C comprise a plurality of fluorescent multibeam elements 120 spaced apart from one another along the light guide length. As illustrated, the fluorescent multibeam elements 120 of the plurality are separated from one another by a finite space and represent individual, distinct elements along the light guide length. That is, by definition herein, the fluorescent multibeam elements 120 of the plurality are spaced apart from one another according to a finite (i.e., non-zero) inter-element distance (e.g., a finite center-to-center distance). Further the fluorescent multibeam elements 120 of the plurality generally do not intersect, overlap or otherwise touch one another, according to some embodiments. As such, each fluorescent multibeam element 120 of the plurality is generally distinct and separated from other ones of the fluorescent multibeam elements 120, e.g., as illustrated.

According to some embodiments, the fluorescent multibeam elements 120 of the plurality may be arranged in either a one-dimensional (1D) array or two-dimensional (2D) array. For example, the plurality of fluorescent multibeam elements 120 may be arranged as a linear 1D array. In another example, the plurality of fluorescent multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the fluorescent multibeam elements 120 may be substantially uniform or constant across the array. In other examples, the inter-element distance between the fluorescent multibeam elements 120 may be varied one or both of across the array and along the length of the light guide 110.

According to various embodiments, a fluorescent multibeam element 120 of the plurality comprises a fluorescent material. The fluorescent multibeam element 120 is configured to provide emitted light (e.g., by fluorescence) from a portion of the guided light 104 within the light guide 110. The emitted light provide by the fluorescent multibeam element 120 has a color-tailored emission pattern. The color-tailored emission pattern corresponds to an arrangement of color sub-pixels of a view pixel in the multiview display, according to various embodiments. Further, the emitted light comprises a plurality of directional light beams 102 having different principal angular directions from one another. The different principal angular directions of the directional light beams 102 correspond to respective view directions of a multiview display, in various embodiments.

In particular, a portion of the guided light 104 may be absorbed by the fluorescent material of the fluorescent multibeam element 120 and then emitted or re-emitted (or 'coupled-out' from the light guide 110) by fluorescent emission. In other words, the guided light 104 guided by and within the light guide 110 may provide a stimulus to produce fluorescent emission by the fluorescent material of the fluorescent multibeam element 120. Further, as is described below in more detail, the fluorescent emission is configured to exhibit the color-tailored emission pattern of the fluorescent multibeam element 120. FIGS. 2A and 2C illustrate the directional light beams 102 of the emitted light as a plurality of diverging arrows depicted as being directed way from the first (or front) surface 110' of the light guide 110.

FIGS. 2A-2C further illustrate an array of light valves 108 configured to modulate the directional light beams 102 of the coupled-out light beam plurality. The light valve array may be part of a multiview display that employs the multiview backlight, for example, and is illustrated in FIGS. 2A-2C along with the multiview backlight 100 for the purpose of facilitating discussion herein. In FIG. 2C, the array of light valves 108 is partially cut-away to allow visualization of the light guide 110 and the fluorescent multibeam element 120 underlying the light valve array.

As illustrated in FIGS. 2A-2C, different ones of the directional light beams 102 having different principal angular directions pass through and may be modulated by different ones of the light valves 108 in the light valve array. Further, as illustrated, a light valve 108 of the array corresponds to a view pixel 106', and a set of the light valves 108 corresponds to a multiview pixel 106 of a multiview display. In particular, a different set of light valves 108 of the light valve array is configured to receive and modulate the directional light beams 102 from different ones of the fluorescent multibeam elements 120, i.e., there is one unique set of light valves 108 for each fluorescent multibeam element 120, as illustrated. In various embodiments, different types of light valves may be employed as the light valves 108 of the light valve array including, but not limited to, one or more of liquid crystal light valves, electrophoretic light valves, and light valves based on electrowetting.

As illustrated in FIG. 2A, a first light valve set 108a is configured to receive and modulate the directional light beams 102 from a first fluorescent multibeam element 120a, while a second light valve set 108b is configured to receive and modulate the directional light beams 102 from a second fluorescent multibeam element 120b. Thus, each of the light valve sets (e.g., the first and second light valve sets 108a, 108b) in the light valve array corresponds, respectively, to a different multiview pixel 106, with individual light valves 108 of the light valve sets corresponding to the view pixels 106' of the respective multiview pixels 106, as illustrated in FIG. 2A. Moreover, as described above, in some embodiments each of the light valve sets (e.g., the first and second light valve sets 108a, 108b) in the light valve array may receive light of different colors corresponding to different color sub-pixels of the light valves in the light valve sets. Thus, in various embodiments the view pixels 106' include color sub-pixels.

In some embodiments, a relationship between the fluorescent multibeam elements 120 of the plurality and corresponding multiview pixels 106 (e.g., sets of light valves 108) may be a one-to-one relationship. That is, there may be an equal number of multiview pixels 106 and fluorescent multibeam elements 120. FIG. 2B explicitly illustrates by way of example the one-to-one relationship where each multiview pixel 106 comprising a different set of light valves 108 is illustrated as surrounded by a dashed line. In other embodiments (not illustrated), the number of multiview pixels 106 and fluorescent multibeam elements 120 may differ from one another.

In some embodiments, an inter-element distance (e.g., center-to-center distance) between a pair of adjacent fluorescent multibeam elements 120 of the plurality may be equal to an inter-pixel distance (e.g., a center-to-center distance) between a corresponding adjacent pair of multiview pixels 106, e.g., represented by light valve sets. For example, as illustrated in FIG. 2A, a center-to-center distance d between the first fluorescent multibeam element 120a and the second fluorescent multibeam element 120b is substantially equal to a center-to-center distance D between the first light valve set 108a and the second light valve set 108b. In other embodiments (not illustrated), the relative center-to-center distances of pairs of fluorescent multibeam elements 120 and corresponding light valve sets may differ, e.g., the fluorescent multibeam elements 120 may have an inter-element spacing (i.e., center-to-center distance d) that is one of greater than or less than a spacing (i.e., center-to-center distance D) between light valve sets representing multiview pixels 106. FIG. 2A also depicts a size S of a view pixel 106'.

According to some embodiments (e.g., as illustrated in FIG. 2A), each fluorescent multibeam element 120 may be configured to provide directional light beams 102 to one and only one multiview pixel 106. In particular, for a given one of the fluorescent multibeam elements 120, the directional light beams 102 having a principal angular direction corresponding to the different colors in a view of the multiview display are substantially confined to a single corresponding multiview pixel 106 and the view pixels 106' thereof, i.e., a single set of light valves 108 corresponding to the fluorescent multibeam element 120, as illustrated in FIG. 2A. As such, each fluorescent multibeam element 120 of the multiview backlight 100 may provide a corresponding set of directional light beams 102 that has a principal angular direction and that includes the different colors in one of the different views of the multiview display. That is, the set of directional light beams 102 contains light beams having a common direction and corresponding to each of the different colors in one of the different view directions. The common direction is provided by the color-tailored emission pattern of the fluorescent multibeam element 120. The common direction may mitigate and, in some examples, substantially eliminate color breakup.

Color breakup is an image artifact of color multiview displays that may occur when a directional light beam 102 emanating from a point passes through a view pixel 106' comprising a plurality of color sub-pixels that are spatially displaced or offset from one another. The spatial offset of the color sub-pixels may effectively result in the directional light beam 102 passing through each of the color sub-pixels at a slightly different angle. Thus, the directional light beam 102 exits the color sub-pixels as a plurality of color directional light beams having slightly different directions from one another. The slightly different directions of the color directional light beams exiting the various color sub-pixels produce a concomitant differential displacement or separation of different colors in an image pixel defined by the view pixel 106'. The differential separation of the different colors is known as color breakup.

Figure 3:
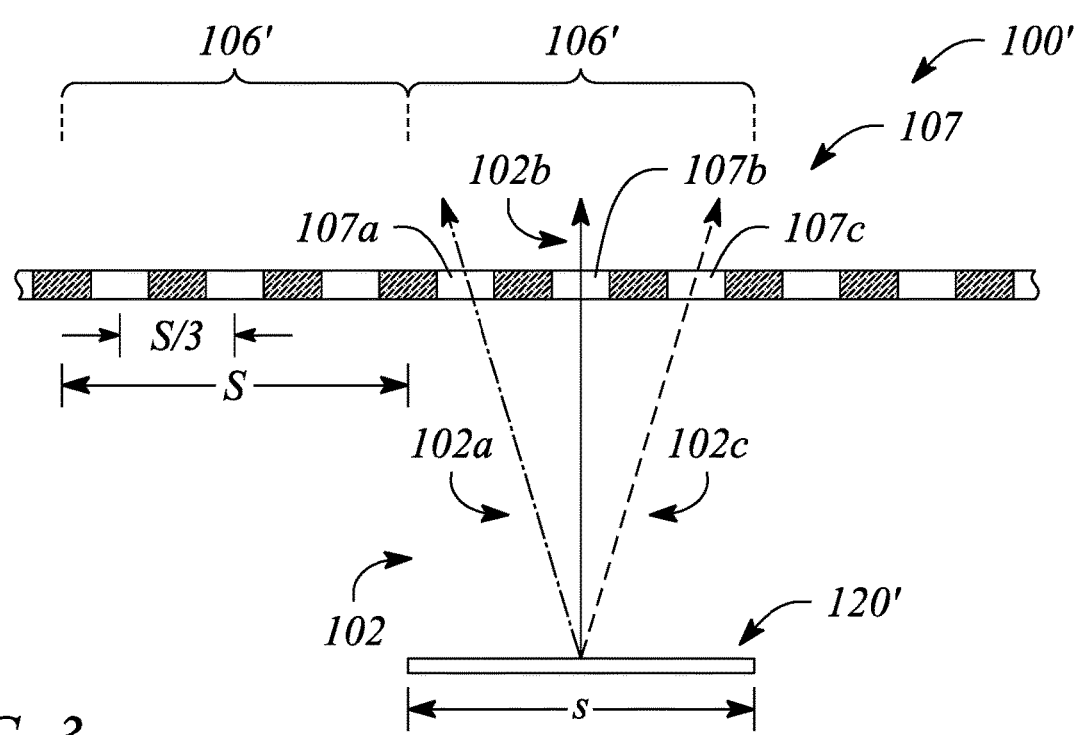
FIG. 3 illustrates a cross sectional view of a portion of a multiview backlight that exhibits color breakup in an example, according to an embodiment consistent with the principles described herein.

FIG. 3 illustrates a cross sectional view of a portion of a multiview backlight 100' that exhibits color breakup in an example, according to an embodiment consistent with the principles described herein. In particular, FIG. 3 illustrates a portion of an example multiview backlight 100' that includes a multibeam element 120' configured to illuminate a view pixel 106' with a directional light beam 102. The multibeam element 120' in FIG. 3 does not have a color-tailored emission pattern (i.e., is not the fluorescent multibeam element 120, as described above). FIG. 3 also illustrates the view pixel 106' comprising a plurality of color sub-pixels 107. The multibeam element 120' and the view pixel 106' each have a comparable size S, i.e., a size s of the multibeam element 120' is about equal to a size S of the view pixel 106' (s≈S). Further, as illustrated, the color sub-pixels 107 are equally spaced within the view pixel 106'. Therefore, since there are three color sub-pixels 107 in the plurality of color sub-pixels 107, as illustrated, a spacing or distance (e.g., center-to-center spacing) between the color sub-pixels 107 is about one-third of the view pixel size S (S/3). The three, color sub-pixels 107 illustrated in FIG. 3 may represent three primary colors (e.g., red (R), green (G), and blue (B) of an RGB color model), for example.

In FIG. 3, the multibeam element 120' acts or serves as an extended point source used to illuminate the color sub-pixels 107 of the view pixel 106', e.g., the color sub-pixels 107 may be color sub-pixels of a light valve that acts as the view pixel 106'. A directional light beam 102 emitted by the multibeam element 120' is illustrated as an arrow extending from a center of the multibeam element 120' through the view pixel 106', or more precisely through the color sub-pixels 107 of the view pixel 106'. Due to the distance between the color sub-pixels 107, the directional light beam 102 effectively comprises a plurality of different color directional light beams having slightly different principal angular directions. Three different color directional light beams 102a, 102b, 102c represented by three arrows and corresponding to each of the three different color sub-pixels 107a, 107b, 107c are illustrated in FIG. 3, for example. When the view pixel 106' is viewed, the slightly different principal angular directions of different color directional light beams 102a, 102b, 102c representing the different colors of the color sub-pixels 107 result in a shift of the various colors relative to one another. That is, the different colors within the view pixel 106' may appear to be visually shifted with respect to one another resulting in color breakup.

Figure 4:
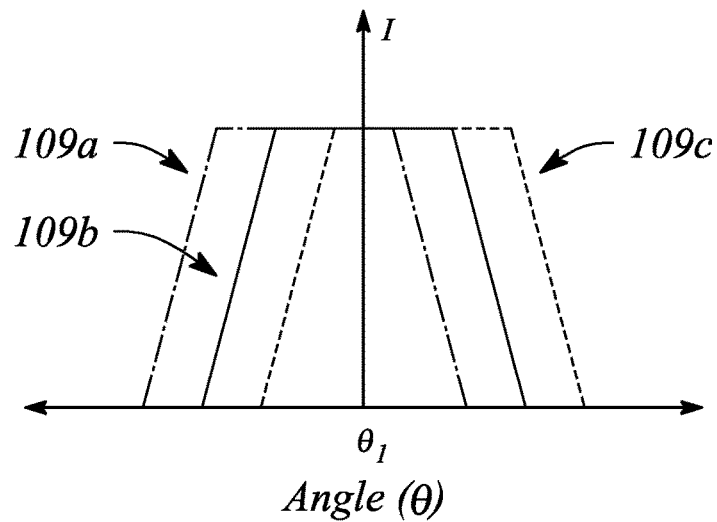
FIG. 4 illustrates a graphical representation of color breakup in an example, according to an embodiment consistent with the principles described herein.

FIG. 4 illustrates a graphical representation of color breakup in an example, according to an embodiment consistent with the principles described herein. As illustrated in FIG. 4, a typical radiation intensity (I) pattern of light at an output of the view pixel 106' is plotted as a function of angle θ for a selected view direction (e.g., $\theta_1$). Curves 109a, 109b, and 109c in FIG. 4 represent different colors of light corresponding to light from a respective one of each of the three example color sub-pixels 107a, 107b, 107c illuminated by the multibeam element 120' illustrated in FIG. 3. For example, curve 109a may represent red (R) light from a red color sub-pixel 107a, curve 109b may represent green (G) light from a green color sub-pixel 107b, and curve 109c may represent blue (B) light from a blue color sub-pixel 107c.

Note that the principal angular directions of the directional light beams 102 that illuminate the three example color sub-pixels 107a, 107b, 107c in FIG. 3 are different from one another. Thus, the radiation intensity (I) pattern of the light for the different colors (e.g., R, G, B) is shifted in angle relative to one another as well (e.g., illustrated the angular shift of curves 109a, 109b, and 109c), resulting in color breakup.

The fluorescent multibeam element 120 having the color-tailored emission pattern may correct for the color breakup by substantially eliminating the slightly different principal angular directions of directional light beams 102 that pass through the different color sub-pixels 107 of the view pixel 106', according to various embodiments. In particular, color-tailored emission pattern of the fluorescent multibeam element 120 may be configured to provide directional light beams 102 of different colors to each of the color sub-pixels 107 where the directional light beams 102 of different colors are substantially parallel to one another due to the color-tailored emission pattern.

According to some embodiments, the fluorescent multibeam element 120 may be viewed as a composite multibeam element or equivalently as a composite extended source comprising a plurality of multibeam sub-elements. The plurality of multibeam sub-elements may have different emission colors from one another. In particular, each of the multibeam sub-elements may comprise a different fluorescent material from other multibeam sub-elements of the multibeam sub-element plurality to provide the different fluorescent emission colors. Further, the plurality of multibeam sub-elements may be arranged to provide the color-tailored emission pattern according to the different fluorescent emission colors, in various embodiments. For example, the multibeam elements may be spatially offset from one another within the fluorescent multibeam element 120 to provide the color-tailored emission pattern.

Figure 5:
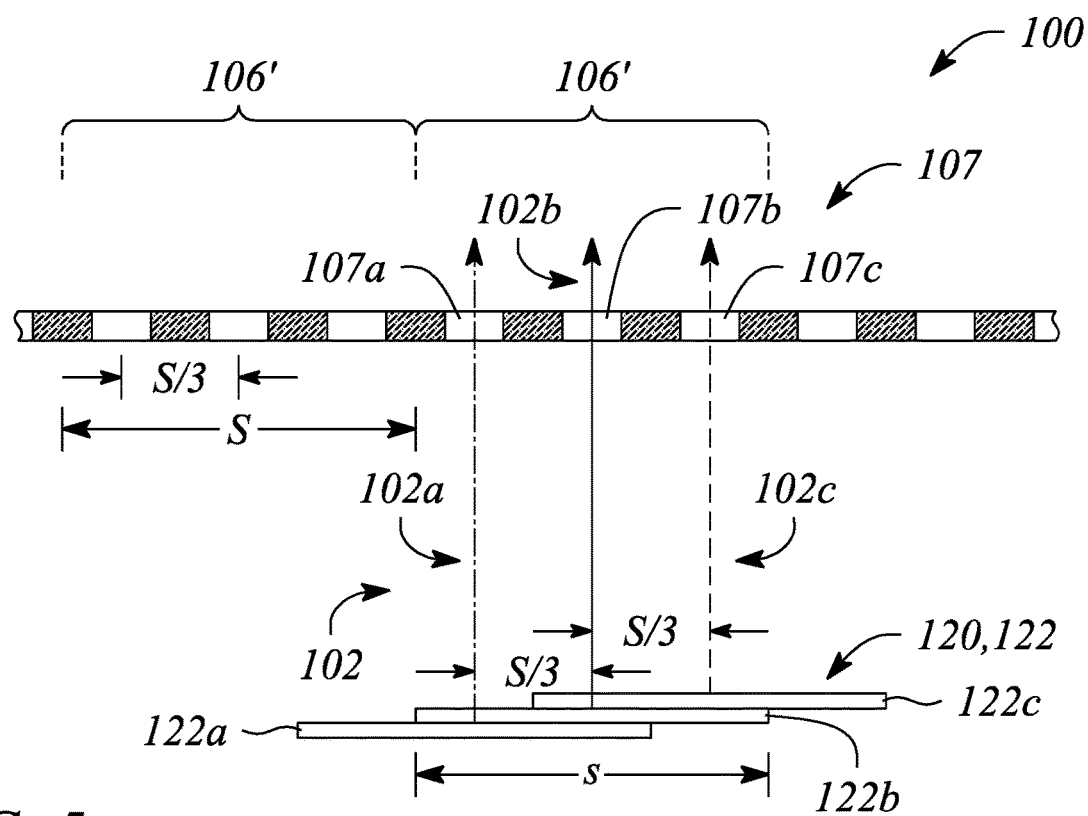
FIG. 5 illustrates a cross sectional view of a portion of a multiview backlight in an example, according to an embodiment consistent with the principles described herein.

FIG. 5 illustrates a cross sectional view of a portion of a multiview backlight 100 in an example, according to an embodiment consistent with the principles described herein. In particular, FIG. 5 illustrates the fluorescent multibeam element 120 (i.e., as a composite multibeam element) including a plurality of multibeam sub-elements 122. As illustrated, the fluorescent material of a first multibeam sub-element 122a may have or be configured to provide a red fluorescent emission color and a second multibeam sub-element 122b have or be configured to provide a green fluorescent emission color. A third multibeam sub-element 122c, as illustrated, may be configured to provide blue emitted light. In some embodiments, the third multibeam sub-element 122c may include a fluorescent material that has or is configured to provide a blue fluorescent emission color. In other embodiment, the third multibeam sub-element 122c may be a diffuser or another scatterer configured to scatter a blue portion of the guided light 104.

Also illustrated in FIG. 5 is a view pixel 106' comprising a plurality of color sub-pixels 107. The illustrated view pixel 106' has a size S and the color sub-pixels 107 are separated by one another by a distance of about one-third of the view pixel size S (i.e., S/3), as illustrated. In FIG. 5, the multibeam sub-elements 122a, 122b, 122c are arranged corresponding to the arrangement of the color sub-pixels 107. For example, the first or red multibeam sub-element 122a having the red fluorescent emission color is arranged corresponding to a location of a first or red (R) color sub-pixel 107a of the view pixel 106' and the second multibeam sub-element 122b is arranged corresponding to a second or green (G) color sub-pixel 107b of the view pixel 106'.

Further, as illustrated, the third or blue multibeam element 122c is arranged corresponding to a location of the third or blue (B) color sub-pixel 107c of the view pixel 106'.

Moreover, in FIG. 5, the multibeam sub-elements 122 of the fluorescent multibeam element 120 are spatially offset from one another by a distance (e.g., about S/3) commensurate with a distance between adjacent color sub-pixels 107 of the view pixel 106'. As such, an arrangement of the multibeam sub-elements 122 (i.e., both in terms of the arrangement of the colors R, G, B and terms of the distance S/3 between the multibeam sub-elements 122) as well the color-tailored emission pattern of the fluorescent multibeam element 120 corresponds to an arrangement of color sub-pixels 107 (i.e., colors R, G, B and color sub-pixel spacing 513) of the view pixel 106', as illustrated in FIG. 5.

According to various embodiments, a size of a multibeam sub-element 122 may be comparable to a size of the view pixel 106'. In particular, the multibeam sub-element size may be between fifty percent and two hundred percent of the view pixel size, according to some embodiments. In FIG. 5, a multibeam sub-element 122 has a size s that is about equal to the view pixel size S (i.e., s≈S), as illustrated.

Further illustrated in FIG. 5 is a directional light beam 102 comprising a plurality of different color directional light beams 102a, 102b, 102c represented by the three different arrows and corresponding to light beams emitted by each of the three different multibeam sub-elements 122a, 122b, 122c, respectively. As illustrated, the three different arrows representing respectively the red (R) color directional light beam 102a, the green (G) color directional light beam 102b, and the blue (B) color directional light beam 102c emitted by the plurality of multibeam sub-elements 122 are each directed through the corresponding color sub-pixel 107a, 107b, 107c. Further, an approximate center or radiation of each of the multibeam sub-elements 122 is spaced to correspond with the spacing (e.g., S/3) of the color sub-pixels 107 in the view pixel 106'. As a result, the different color directional light beams 102a, 102b, 102c for each of the different colors of emitted light (i.e., R, G, B) according to the color-tailored emission pattern of the fluorescent multibeam element 120 are substantially parallel to one another (i.e., have substantially the same principal angular directions). Since the different color directional light beams 102a, 102b, 102c provided by the color-tailored emission pattern of the fluorescent multibeam element 120 have substantially the same principal angular directions, the view pixel 106' may be free of color breakup, according to various embodiments.

According to various embodiments, the fluorescent material of the fluorescent multibeam element 120 (e.g., in a multibeam sub-elements 122 of the multibeam sub-element plurality) is configured to absorb a portion of the guided light 104 (which may be blue light or ultraviolet light, for example) and to reemit the plurality of directional light beams 102 having different colors, e.g., the different color directional light beams 102a, 102b, 102c. In some embodiments, the fluorescent material may include various different types of fluorescent materials or fluorescent pigments configured to provide different fluorescent emission colors of the color-tailored emission pattern. According to other embodiments, the fluorescent multibeam element 120 may include a plurality of fluorescent nanoparticle resonators or fluorescent quantum dots of different types that correspond to the different colors of emitted light.

In particular, the plurality of fluorescent quantum dots may comprise a first type of fluorescent quantum dots having a size consistent with production of a red fluorescent emission color. The plurality of fluorescent quantum dots may further comprise a second type of fluorescent quantum dots having a size consistent with production of a green fluorescent emission color. In some embodiments, the plurality of fluorescent quantum dots further comprises a third type of quantum dots having a size consistent with production of a blue fluorescent emission color. For example, emission colors corresponding to a range of wavelengths of the emitted light having the color-tailored emission pattern may be provided by fluorescent quantum dots having sizes or diameters between about two nanometers (nm) and about six nm (2-6 nm).

In particular, fluorescent quantum dots having sizes in the 2-6 nm range may be configured to emit light by fluorescent emission having wavelengths over the visible range (e.g., from blue to red) when illuminated with light (e.g., guided light 104) having a wavelength of less than or equal to about four hundred fifty nanometers (450 nm), by way of example and not limitation. Wavelengths in the visible range between substantially blue light and red light may include light with wavelengths from about four hundred fifty nanometers (e.g., ~450-475 nm) to about six hundred fifty or seven hundred nanometers (e.g., ~650-700 nm), for example. Thus, a red multibeam sub-element 122 comprising fluorescent quantum dots having a red fluorescent emission color may absorb blue or ultraviolet light (e.g., light at or below about 450 nm) and may emit red light (e.g., light at about 650 nm). Similarly, a green multibeam sub-element 122 comprising fluorescent quantum dots having a green fluorescent emission color may absorb blue or ultraviolet light and emit green light (e.g., light at about 500 nm). According to various embodiments, a blue multibeam sub-element 122 either may be a diffuser that substantially passes and scatters blue light (e.g., light at about 475 nm) or may include one or more fluorescent quantum dots having a blue fluorescent emission color that absorb ultraviolet light (e.g., light at less than about 450 nm) and emit blue light. In yet other embodiments, the fluorescent material of the fluorescent multibeam element 120 may comprise any of a variety of fluorescent materials including, but not limited to, various semiconductors (e.g., cadmium selenide), fluorescent organic materials, or a combination thereof.

In some embodiments, the fluorescent multibeam element 120 may be located adjacent to a second surface 110" of the light guide 110 opposite a first surface 110'. The fluorescent multibeam element 120 may be configured to provide the emitted light comprising the plurality of directional light beams 102 through the first surface 110' of the light guide 110, for example. In some embodiments, the fluorescent multibeam element 120 further comprises a reflection layer adjacent a side of the fluorescent material opposite a side facing the light guide first surface 110'. The reflection layer may be configured to reflect a portion of the emitted light directed away from the first surface 110' and to redirect the reflected emitted light portion back toward the first surface 110' of the light guide 110, for example.

Figure 6:
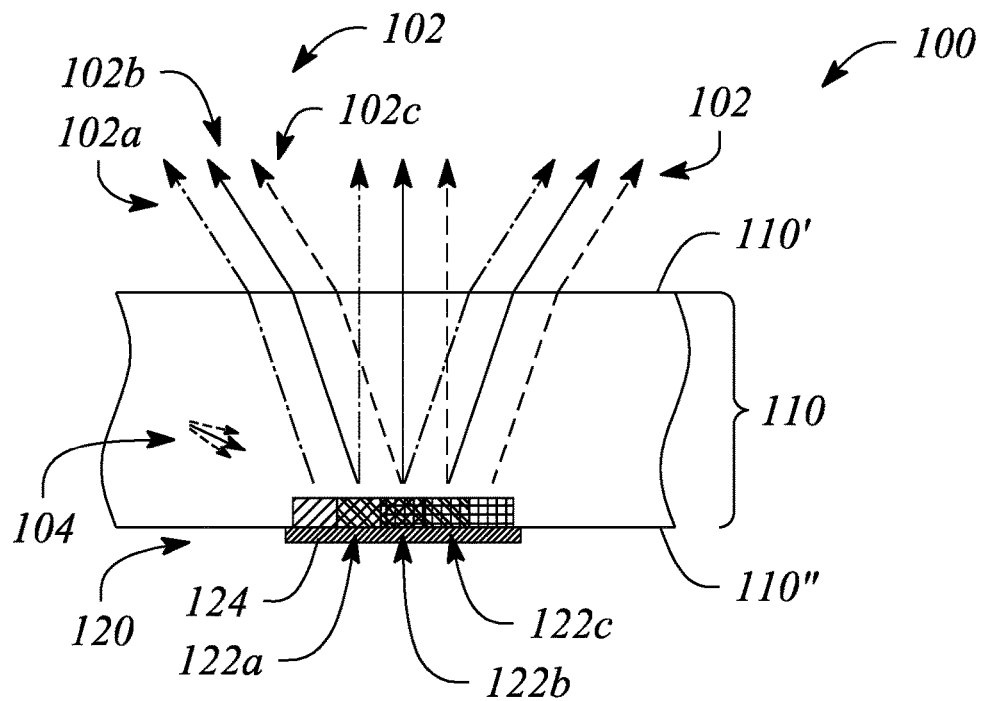
FIG. 6 illustrates a cross sectional view of a portion of a multiview backlight in an example, according to an embodiment consistent with the principles described herein.

FIG. 6 illustrates a cross sectional view of a portion of a multiview backlight 100 in an example, according to an embodiment consistent with the principles described herein. As illustrated, the portion of the multiview backlight 100 comprises the light guide 110 and the fluorescent multibeam element 120 adjacent to the second surface 110" of the light guide 110 opposite to the first surface 110'. The illustrated fluorescent multibeam element 120 includes a plurality of multibeam sub-elements 122a, 122b, 122b and is configured to provide emitted light having the color-tailored emission pattern when illuminated by the guided light 104. Further, the emitted light comprises the plurality of directional light beams 102, each directional light beam 102 of the plurality having a different principal angular direction. Moreover, as illustrated, each of the directional light beams 102 includes a plurality of different color directional light beams 102a, 102b, 102c. Each of the different color directional light beam 102a, 102b, 102c of a directional light beam 102 has substantially the same principal angular direction as the directional light beam 102.

FIG. 6 further illustrates a reflection layer 124 configured to cover the fluorescent material of the fluorescent multibeam element 120. The reflection layer 124 may comprise substantially any reflective material including, but not limited to, a reflective metal and an enhanced specular reflector (ESR) film. For example, the reflection layer 124 may be a Vikuiti ESR film manufactured by 3M Optical Systems Division, St. Paul, Minn., USA.

Figure 7A:
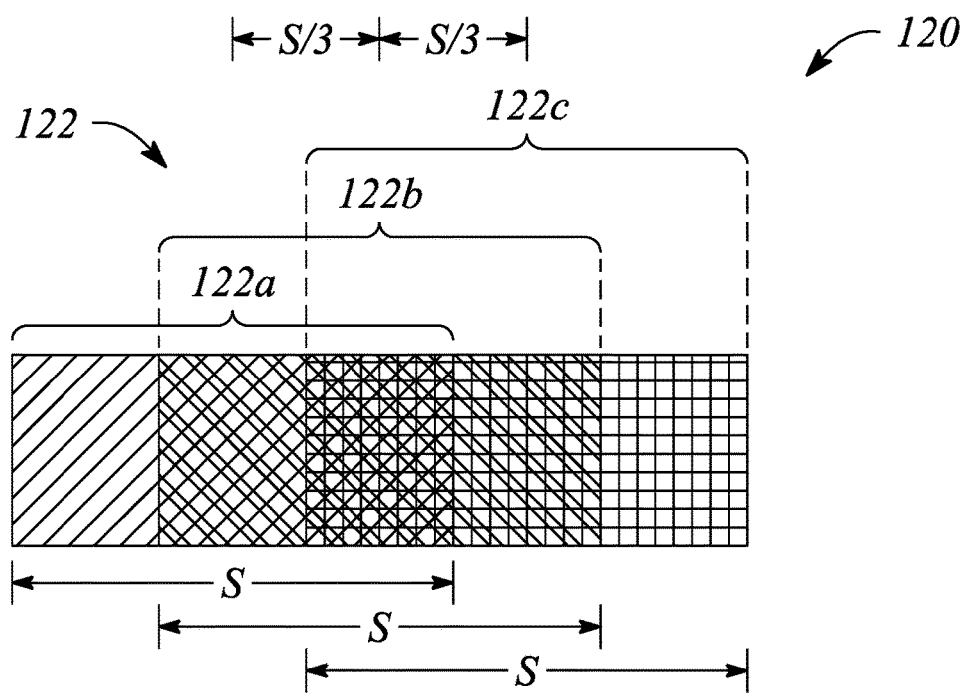
FIG. 7A illustrates a cross sectional view of a fluorescent multibeam element in an example, according to an embodiment consistent with the principles described herein.
Figure 7B:
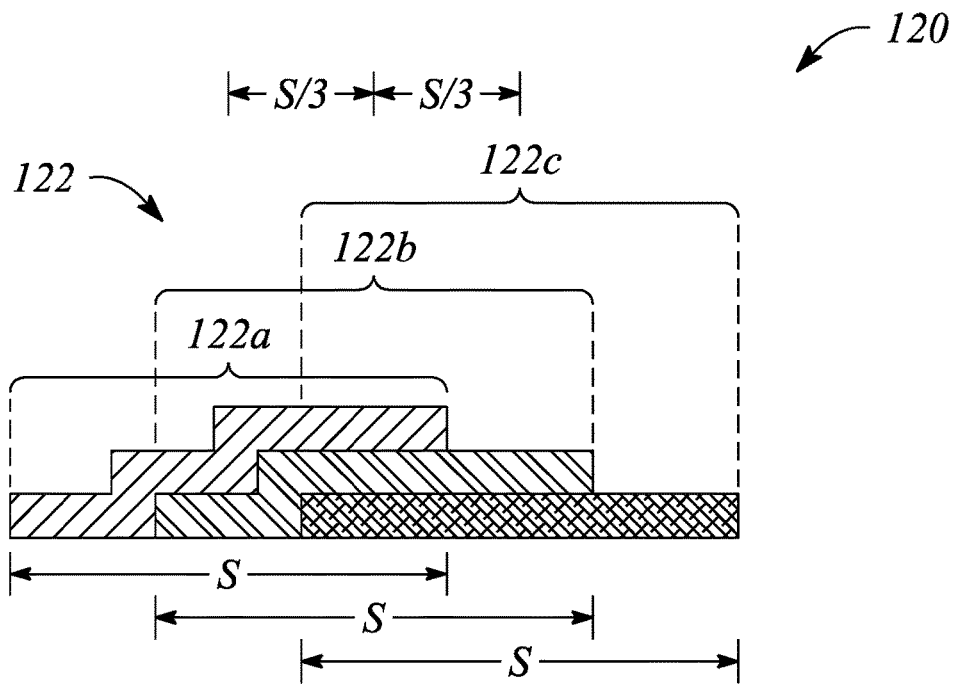
FIG. 7B illustrates a cross sectional view of a fluorescent multibeam element in an example, according to another embodiment consistent with the principles described herein.

FIG. 7A illustrates a cross sectional view of a fluorescent multibeam element 120 in an example, according to an embodiment consistent with the principles described herein. FIG. 7B illustrates a cross sectional view of a fluorescent multibeam element 120 in an example, according to another embodiment consistent with the principles described herein. The fluorescent multibeam element 120 illustrated in FIGS. 7A and 7B may be the fluorescent multibeam element 120 illustrated in FIG. 6, for example.

As illustrated, fluorescent multibeam element 120 comprises a plurality of multibeam sub-elements 122. A first multibeam sub-element 122a of the multibeam sub-element plurality comprises a first fluorescent material having a first (e.g., red) fluorescent emission color and is denoted by a first crosshatch pattern. A second multibeam sub-element 122b of the multibeam sub-element plurality comprises a second fluorescent material having a second (e.g., green) fluorescent emission color and is denoted by a second crosshatch pattern. In FIG. 7A, a third multibeam sub-element 122c of the multibeam sub-element plurality comprises a third fluorescent material having a third (e.g., blue) fluorescent emission color and is denoted by a third crosshatch pattern. In FIG. 7B, the third multibeam sub-element 122c of the multibeam sub-element plurality comprises a diffuser or scatter configured to scatter light (e.g., blue light) as opposed to emit light by fluorescence. The third multibeam sub-element 122c in FIG. 7B is denoted by a fourth crosshatch pattern. Note that, while not so illustrated, the third multibeam sub-element 122c of FIG. 7B could equally well have included the third fluorescent material instead of or in addition to the diffuser.

The three multibeam sub-elements 122a, 122b, 122c illustrated in FIGS. 7A-7B are spatially offset from one another by a distance S/3 commensurate with a similar spacing of corresponding color sub-pixels of a view pixel (not illustrated). For example, the color sub-pixels and spacing thereof may be substantially similar to that illustrated in FIG. 5. Further, the three multibeam sub-elements 122a, 122b, 122c each have a size S commensurate with the size of a view pixel (e.g., also substantially similar to that illustrated in FIG. 5).

In FIG. 7A, the fluorescent materials of respective ones of the three multibeam sub-elements 122a, 122b, 122c are mixed with one another in at least a portion of the fluorescent multibeam element 120. Mixing of fluorescent materials, as illustrated may provide multibeam sub-elements 122 having the size S while still enabling a center-to-center or inter-element spacing of the multibeam sub-elements 122 to be determined by or to be substantially equal to the color sub-pixel spacing (e.g., S/3), for example. In FIG. 7B, the fluorescent materials of the first and second multibeam sub-elements 122a, 122b and the diffuser of the third multibeam sub-element 122c overlap one another in adjacent regions of the multibeam sub-elements 122 to provide the center-to-center spacing S/3 therebetween. In yet other non-limiting examples (not illustrated), the fluorescent materials and materials of a diffuser of the multibeam sub-elements 122 may be deposited on top of one another. Note that the illustrated inter-element spacing S/3 in FIGS. 7A and 7B is provided by way of example for discussion purposes only.

In some embodiments, a shape of the multibeam sub-element 122 of the fluorescent multibeam element 120 is analogous to a shape of a multiview pixel or equivalently, a shape of a set (or 'sub-array') of the light valves corresponding to the multiview pixel. For example, the multibeam sub-element 122 may have a square shape when the multiview pixel (or an arrangement of a corresponding set of light valves) is substantially square. In another example, the multiview pixel may have a rectangular shape, i.e., may have a length or longitudinal dimension that is greater than a width or transverse dimension. In this example, the multibeam sub-element 122 corresponding to the rectangular multiview pixel may have an analogous rectangular shape. In yet other examples, the multibeam sub-element 122 and the corresponding multiview pixel may have various other shapes including or at least approximated by, but not limited to, a triangular shape, a hexagonal shape, and a circular shape.

Figure 7C:
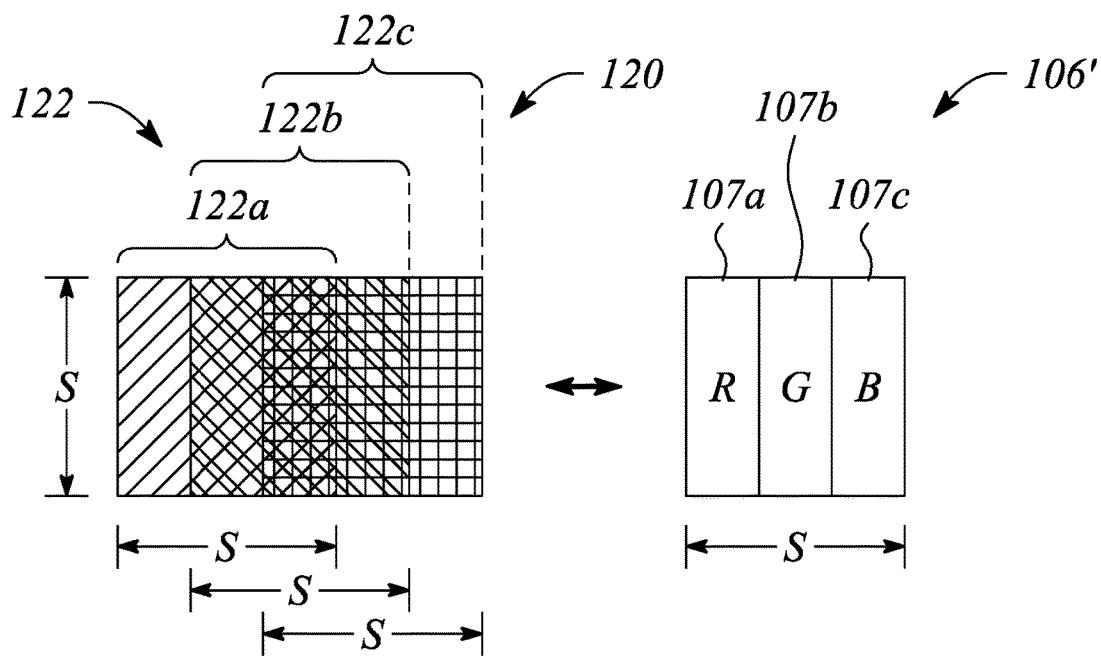
FIG. 7C illustrates a top or plan view of a fluorescent multibeam element having a square-shaped multibeam subelement in an example, according to an embodiment consistent with the principles described herein.

FIG. 7C illustrates a top or plan view of a fluorescent multibeam element 120 having a square-shaped multibeam sub-element 122 in an example, according to an embodiment consistent with the principles described herein. The shape of the square-shaped multibeam sub-element 122 illustrated in FIG. 7C may be analogous to the square shape of the multiview pixel 106 comprising a square set of light valves 108 illustrated in FIG. 2A-2C, for example. FIG. 7C also illustrates a set of three multibeam sub-elements 122a, 122b, 122c by way of example and not limitation. As illustrated, the three multibeam sub-elements 122a, 122b, 122c are arranged in a manner corresponding to an arrangement of color sub-pixels 107a, 107b, 107c in a view pixel 106', also illustrated in FIG. 7C. The color sub-pixels 107a, 107b, 107c in the view pixel 106' of FIG. 7C may be arranged in a direction (e.g., from '107a' to '107c') of a pixel row of the multiview pixel (e.g., multiview pixel 106 of FIGS. 2A-2C), for example. A double-headed arrow signifies the arrangement correspondence in FIG. 7C.

According to other embodiments (not illustrated), any of a variety of arrangements of multibeam sub-elements corresponding to color sub-pixel arrangements including, but not limited to, a triangular arrangement may be employed. Also note that, while a color-order both of the color sub-pixels and the corresponding multibeam sub-elements 122a, 122b, 122c is described herein as generally being red (R) to green (G) to blue (B), this specific color-order arrangement is used for discussion purposes only. In general, substantially any color-order arrangement and, for that matter, also any set of colors may be employed and still be within the scope described herein. For example (not illustrated), the color-order arrangement of the color sub-pixels and corresponding color-order arrangement of the multibeam sub-elements may be green (G) to blue (B) to red (R) or blue (B) to green (G) to red (R), etc., when employing primary colors based on an RGB color model. Further, in general, various embodiments of the fluorescent multibeam elements 120 described herein may be defined or otherwise realized either on or within the light guide 110 using any of a variety of fabrication techniques. For example, the fluorescent material of the fluorescent multibeam element 120 may be configured or defined using an additive process, such as deposition, ink-jet printing, etc.

Referring again to FIG. 2A, the multiview backlight 100 may further comprise a light source 130. According to various embodiments, the light source 130 is configured to provide the light to be guided within light guide 110. In particular, the light source 130 may be located adjacent to an entrance surface or end (input end) of the light guide 110. In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color, such as blue or ultraviolet light. For example, the light source 130 may provide blue light. With blue light provided by the light source 130, the fluorescent multibeam elements 120 may include a red fluorescent material (e.g., a red fluorescent quantum dot) and a green fluorescent material (e.g., a green fluorescent quantum dot) and a blue diffuser to output, respectively, red, green and blue emitted light as the directional light beams 102. In another example, the light source 130 may provide ultraviolet light, and the fluorescent multibeam elements 120 may include fluorescent material configured to provide each of red, green and blue emitted light (e.g., red, green and blue fluorescent quantum dots). However, in some embodiments the light source 130 may be configured to produce light having a substantially broadband spectrum that encompasses multiple colors, e.g., polychromatic or white light that may include one or both of blue and ultraviolet light.

In some embodiments, the light source 130 may further comprise a collimator configured to couple light into the light guide 110. The collimator may be configured to receive substantially uncollimated light from one or more of the optical emitters of the light source 130. The collimator is further configured to convert the substantially uncollimated light into collimated light. In particular, the collimator may provide collimated light having the non-zero propagation angle and being collimated according to a predetermined collimation factor (e.g., collimation factor σ), according to some embodiments. The collimator is further configured to communicate the collimated light beam to the light guide 110 to propagate as the guided light 104, described above. In other embodiments, substantially uncollimated light may be provided by the light source 130 and the collimator may be omitted.

In some embodiments, the multiview backlight 100 is configured to be substantially transparent to light in a direction through the light guide 110 orthogonal to a propagation direction 103, 103' of the guided light 104. In particular, the light guide 110 and the spaced apart plurality of fluorescent multibeam elements 120 allow light to pass through the light guide 110 through both the first surface 110' and the second surface 110", in some embodiments. Transparency may be facilitated, at least in part, due to both the relatively small size of the fluorescent multibeam elements 120 and the relative large inter-element spacing (e.g., one-to-one correspondence with multiview pixels 106) of the fluorescent multibeam element 120. Further, the fluorescent multibeam elements 120 may reemit light propagating orthogonal to the light guide surfaces 110', 110", according to some embodiments.

In some embodiments, the multiview backlight 100 is configured to emit light (e.g., as the plurality of directional light beams 102) that varies as a function of distance along a length of the light guide 110. In particular, the fluorescent multibeam elements 120 (or of the multibeam sub-elements 122) along the light guide 110 may be configured to provide the emitted light having an intensity that varies as a function of distance along the light guide in a propagation direction 103, 103' of the guided light 104 from one fluorescent multibeam element 120 to another. Varying the intensity of the emitted light may compensate for or mitigate a variation (e.g., a decrease) in an intensity of the guided light 104 along a length of the light guide 110 due to incremental absorption of the guided light 104 during propagation, for example. In some embodiments, a density of the fluorescent material is a function of a location of the fluorescent multibeam element 120 along the light guide 110 and the fluorescent material density is configured to vary an intensity of the emitted light provided by the fluorescent multibeam element 120 as a function of distance along the light guide 110 in a propagation direction 103, 103' of the guided light 104. In other words, the emitted light intensity as a function of distance may be provided or controlled by varying the density of the fluorescent material of individual fluorescent multibeam elements 120 of the plurality. In some embodiments, the fluorescent material density is defined as a density of the fluorescent structures within the fluorescent material. In other embodiments, the fluorescent material density used to control the emitted light intensity may be varied by incorporating gaps or holes in the fluorescent material of the fluorescent multibeam elements 120. In these embodiments, the term 'density' may be defined as a coverage density of the fluorescent material across the fluorescent multibeam element 120.

In accordance with some embodiments of the principles described herein, a multiview display is provided. The multiview display is configured to emit modulated light beams as pixels of the multiview display. Further, the emitted modulated light beams may comprise light beams representing a plurality of different colors (e.g., red, green, blue of an RGB color model). According to various embodiments, the emitted modulated light beams, e.g., including the different colors, may be preferentially directed toward a plurality of viewing directions of the multiview display. In some examples, the multiview display is configured to provide or 'display' a 3D or multiview image. Moreover, the multiview image may be a color multiview image. For example, the multiview image may represent in color a 3D scene displayed on a mobile device such as, but not limited to, a mobile telephone, tablet computer, or the like. Different ones of the modulated, different color and differently directed light beams may correspond to individual pixels of different 'views' associated with the multiview image, according to various examples. The different views may provide a 'glasses free' (e.g., an 'automultiscopic') representation of information in the color multiview image being displayed by the multiview display, for example.

Figure 8:
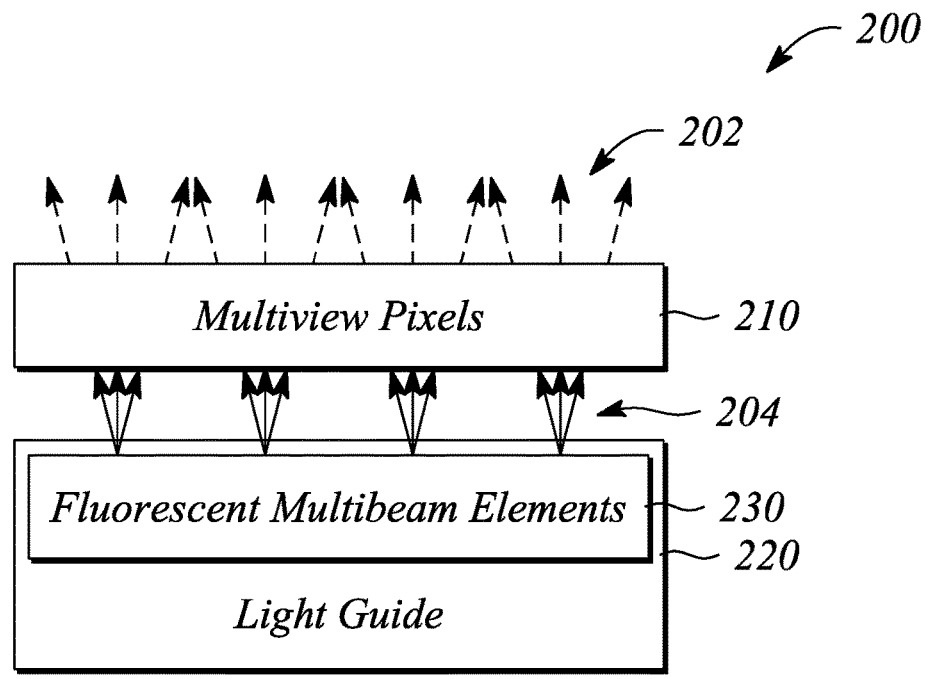
FIG. 8 illustrates a block diagram of a multiview display in an example, according to an embodiment consistent with the principles described herein.

FIG. 8 illustrates a block diagram of a multiview display 200 in an example, according to an embodiment consistent with the principles described herein. The multiview display 200 is configured to display a multiview image (e.g., color multiview image) according to different views in corresponding different view directions. In particular, modulated directional light beams 202 emitted by the multiview display 200 are used to display the multiview image and may correspond to pixels of the different views (i.e., view pixels), including color sub-pixels in each of the different views that are associated with different colors. The modulated directional light beams 202 are illustrated as arrows emanating from multiview pixels 210 in FIG. 8. Dashed lines are used for the arrows depicting the directional modulated light beams 202 emitted by the multiview display 200 to emphasize the modulation thereof by way of example and not limitation.

The multiview display 200 illustrated in FIG. 8 comprises an array of the multiview pixels 210. The multiview pixels 210 of the array are configured to provide a plurality of different views of the multiview display 200. According to various embodiments, a multiview pixel 210 of the array comprises a plurality of view pixels configured to modulate a plurality of directional light beams 204 and produce the modulated directional light beams 202. In some embodiments, the multiview pixel 210 is substantially similar to a set of light valves 108 of the array of light valves 108, described above with respect to the multiview backlight 100. In particular, a view pixel of the multiview pixel 210 may be substantially similar to the above-described light valves 108. That is, a multiview pixel 210 of the multiview display 200 may comprise a set of light valves (e.g., a set of light valves 108), and a view pixel of the multiview pixel 210 may comprise a plurality of light valves of the set. Further, the view pixel may comprise color sub-pixels, each color sub-pixel representing a light valve (e.g., a single light valve 108) of the set of light valves, for example.

The multiview display 200 illustrated in FIG. 8 further comprises a light guide 220 configured to guide light. The guided light within the light guide 220 may comprise one or both of blue light and ultraviolet light, for example. In some embodiments, the light guide 220 of the multiview display 200 may be substantially similar to the light guide 110 described above with respect to the multiview backlight 100.

As illustrated in FIG. 8, the multiview display 200 further comprises an array of fluorescent multibeam elements 230. A fluorescent multibeam element 230 of the element array comprises a fluorescent material. The fluorescent multibeam element 230 of the element array is configured to provide emitted light from guided light. The emitted light has a color-tailored emission pattern and comprises the plurality of directional light beams 204, according to various embodiments. In some embodiments, the fluorescent multibeam element 230 of the element array may be substantially similar to the fluorescent multibeam element 120 of the multiview backlight 100, described above. In particular, the color-tailored emission pattern may correspond to an arrangement of color sub-pixels of a view pixel in the view pixel plurality of the multiview pixels 210.

Further, the fluorescent multibeam element 230 of the element array is configured to provide the plurality of directional light beams 204 to a corresponding multiview pixel 210. Light beams 204 of the plurality of directional light beams 204 have different principal angular directions from one another, according to various embodiments. In particular, the different principal angular directions of the directional light beams 204 correspond to different view directions of the different views of the multiview display 200, and each of the view directions includes different colors along a corresponding principal angular direction. Moreover, owing to the color-tailored emission pattern, the different colors of directional light beams 204 corresponding to a common view direction may be substantially parallel to one another, according to various embodiments.

According to some embodiments, the fluorescent multibeam element 230 may comprise a plurality of multibeam sub-element substantially similar to the multibeam sub-elements 122, described above. In particular, the fluorescent multibeam element 230 may comprise a plurality of multibeam sub-elements (not separately illustrated in FIG. 8) having different fluorescent emission colors from one another. Each of the multibeam sub-elements may comprise a different fluorescent material from other multibeam sub-elements of the multibeam sub-element plurality to provide the different fluorescent emission colors. Further, the plurality of multibeam sub-elements may be arranged to provide the color-tailored emission pattern according to the different fluorescent emission colors. In other embodiments, one or more of the multibeam sub-elements may comprise a substantially non-fluorescent material and act or serve as diffuser of scatter in conjunction with other ones of the multibeam sub-elements that include the fluorescent materials.

According to some embodiments, a size of the multibeam sub-element is comparable to a size of a view pixel of the view pixel plurality. The comparable size of the multibeam sub-element may be greater than one half of the view pixel size and less than twice the view pixel size, for example. Further, the multibeam sub-elements may be spatially offset from one another by a distance commensurate with (e.g., about equal to) a distance between adjacent color sub-pixels of the view pixel, according to some embodiments.

In some embodiments, the fluorescent material of the fluorescent multibeam element 230 or equivalently the multibeam sub-element(s) comprises a plurality of fluorescent quantum dots. A fluorescent emission color of the fluorescent material may be a function of a size distribution of the fluorescent quantum dots within the fluorescent material, for example. In other embodiments, the fluorescent material may include, but is not limited to, a plurality of fluorescent pigments.

In some embodiments, an inter-element or center-to-center distance between multibeam sub-elements of the fluorescent multibeam element 230 may correspond to an inter-pixel distance between color sub-pixels of the view pixel in the multiview pixels 210. For example, the inter-element distance between the multibeam sub-elements may be substantially equal to the inter-pixel distance between the color sub-pixels. Further, there may be a one-to-one correspondence between the multiview pixels 210 of the multiview pixel array and the fluorescent multibeam elements 230 of the element array. In particular, in some embodiments, the inter-element distance (e.g., center-to-center) between the fluorescent multibeam elements 230 may be substantially equal to the inter-pixel distance (e.g., center-to-center) between the multiview pixels 210. As such, each view pixel in the multiview pixel 210 may be configured to modulate a different one of the plurality of light beams 204 provided by a corresponding fluorescent multibeam element 230. Further, each multiview pixel 210 may be configured to receive and modulate the light beams 204 from one and only one fluorescent multibeam element 230, according to various embodiments.

As described above, the plurality of light beams 204 may include different colors, and the fluorescent multibeam elements 230 may direct a color-tailored emission pattern that includes the plurality of light beams 204 to corresponding color sub-pixels of view pixels in multiview pixels 210. Further, the principal angular directions of the different colors in a particular view direction of the multiview display 200 may be aligned (i.e., the same), eliminating or substantially eliminating spatial color separation or color breakup, according to various embodiments.

In some embodiments (not illustrated in FIG. 8), the multiview display 200 may further comprise a light source. The light source may be configured to provide the light to the light guide. According to some embodiments, the light source may be substantially similar to the light source 130 of the multiview backlight 100, described above. For example, the light provided by the light source may comprise one or both of blue light and ultraviolet light.

Figure 9:
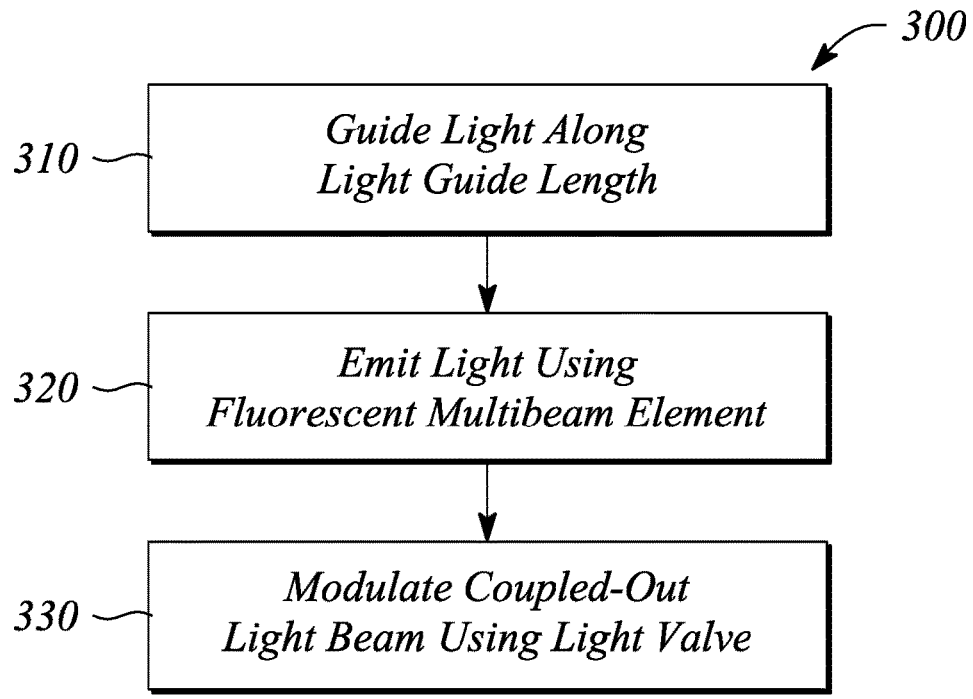
FIG. 9 illustrates a flow chart of a method of multiview backlight operation in an example, according to an embodiment consistent with the principles described herein.

In accordance with other embodiments of the principles described herein, a method of multiview backlight operation is provided. FIG. 9 illustrates a flow chart of a method 300 of multiview backlight operation in an example, according to an embodiment consistent with the principles described herein. As illustrated in FIG. 9, the method 300 of multiview backlight operation comprises guiding 310 light along a length of a light guide. According to some embodiments, the light guide may be substantially similar to the light guide 110 described above with respect to the multiview backlight 100. In some examples, the guided light may be collimated according to a predetermined collimation factor σ.

As illustrated in FIG. 9, the method 300 of multiview backlight operation further comprises emitting 320 light by fluorescent emission from the guided light using an array of fluorescent multibeam elements. According to various embodiments, the emitted light comprises a plurality of directional light beams having different principal angular directions corresponding to respective different view directions of a multiview display. Further, the directional light beams have or represent different colors of light (e.g., red, green, blue). In some embodiments, the fluorescent multibeam elements may be substantially similar to the fluorescent multibeam elements 120 of the multiview backlight 100 described above. For example, a fluorescent multibeam element of the array may comprise a fluorescent material and have a color-tailored emission pattern. The color-tailored emission pattern may correspond to an arrangement of color sub-pixels of a view pixel in the multiview display, for example.

Further, in some embodiments, the fluorescent multibeam element may comprise a plurality of multibeam sub-elements spatially offset from one another by a distance corresponding to a distance between the color sub-pixels. The fluorescent material within a multibeam sub-element may emit a different color of emitted light from other multibeam sub-elements of fluorescent multibeam element to provide the color-tailored emission pattern from the guided light.

In some embodiments (not illustrated), the method 300 of multiview backlight operation further comprises providing light to the light guide using a light source. The provided light may be collimated according to a collimation factor to provide a predetermined angular spread of the guided light within the light guide. In some embodiments, the light source may be substantially similar to the light source 130 of the multiview backlight 100, described above. For example, the provided light may comprise one or both of blue light and ultraviolet light.

In some embodiments (e.g., as illustrated in FIG. 9), the method 300 of multiview backlight operation further comprises optionally modulating 330 the coupled-out light beams using light valves configured as a multiview pixel of a multiview display. According to some embodiments, a light valve of a plurality or array of light valves corresponds to a color sub-pixel of a view pixel within the multiview pixel.

Thus, there have been described examples and embodiments of a multiview backlight, a method of multiview backlight operation, and a multiview display that employ a fluorescent multibeam element having a color-tailored emission pattern to provide directional light beams corresponding to a plurality of different views of a multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight comprising:
a light guide configured to guide light as guided light; and
a fluorescent multibeam element comprising a fluorescent material and being configured to provide emitted light having a color-tailored emission pattern from the guided light, the emitted light comprising a plurality of directional light beams having different principal angular directions corresponding to respective different view directions of a multiview display,
wherein the color-tailored emission pattern corresponds to an arrangement of color sub-pixels of a view pixel in the multiview display;
wherein the fluorescent multibeam element comprises a plurality of multibeam sub-elements having different fluorescent emission colors from one another; and
wherein the plurality of multibeam sub-elements includes two multibeam sub-elements that overlap in adjacent regions of the two multibeam sub-elements.

2. The multiview backlight of claim 1, wherein each of the multibeam sub-elements comprises a different fluorescent material from other multibeam sub-elements of the multibeam sub-element plurality to provide the different fluorescent emission colors and the plurality of multibeam sub-elements being arranged to provide the color-tailored emission pattern according to the different fluorescent emission colors.

3. The multiview backlight of claim 2, wherein the fluorescent material of a first multibeam sub-element has a red fluorescent emission color and a second multibeam sub-element has a green fluorescent emission color, the first multibeam sub-element being arranged corresponding to a location of a red color sub-pixel of the view pixel and the second multibeam sub-element being arranged corresponding to a green color sub-pixel of the view pixel.

4. The multiview backlight of claim 3, wherein the fluorescent material of a third multibeam sub-element has blue fluorescent emission color, the third multibeam sub-element being arranged corresponding to a location of a blue color sub-pixel of the view pixel.

5. The multiview backlight of claim 2, wherein the multibeam sub-elements of the fluorescent multibeam element are spatially offset from one another by a distance commensurate with a distance between adjacent color sub-pixels of the view pixel, a size of a multibeam sub-element being comparable to a size of the view pixel.

6. The multiview backlight of claim 5, wherein the multibeam sub-element size is between fifty percent and two hundred percent of the view pixel size.

7. The multiview backlight of claim 1, wherein the fluorescent material comprises a plurality of fluorescent quantum dots, the color-tailored emission pattern being a function of a size distribution of the fluorescent quantum dots within the fluorescent material distributed across the fluorescent multibeam element.

8. The multiview backlight of claim 7, wherein the plurality of fluorescent quantum dots comprises a first type of fluorescent quantum dots having a size consistent with production of a red fluorescent emission color and a second type of fluorescent quantum dots having a size consistent with production of a green fluorescent emission color.

9. The multiview backlight of claim 8, wherein the plurality of fluorescent quantum dots further comprises a third type of quantum dots having a size consistent with production of a blue fluorescent emission color.

10. The multiview backlight of claim 1, wherein the fluorescent multibeam element is located adjacent to a second surface of the light guide opposite a first surface, the fluorescent multibeam element being configured to provide the emitted light comprising the plurality of directional light beams through the first surface of the light guide.

11. The multiview backlight of claim 10, wherein the fluorescent multibeam element further comprises a reflection layer configured to cover a side of the fluorescent material opposite a side facing the light guide first surface, wherein the reflection layer is configured to reflect a portion of the emitted light directed away from the first surface and to redirect the reflected emitted light portion back toward the first surface of the light guide.

12. The multiview backlight of claim 1, further comprising a light source optically coupled to an input of the light guide, the light source being configured to provide light comprising one or both of blue light and ultraviolet light to be guided within the light guide as the guided light.

13. The multiview backlight of claim 1, wherein a density of the fluorescent material is a function of a location of the fluorescent multibeam element along the light guide, the fluorescent material density being configured to vary an intensity of the emitted light provided by the fluorescent multibeam element as a function of distance along the light guide in a propagation direction of the guided light.

14. A multiview display comprising the multiview backlight of claim 1, the multiview display further comprising an array of light valves configured to modulate light beams of the plurality of directional light beams, a light valve of the array corresponding to a view pixel and including the color sub-pixels.

15. A multiview display comprising:
an array of multiview pixels configured to provide different views of a multiview image, a multiview pixel comprising a plurality of view pixels configured to modulate a corresponding plurality of directional light beams having different principal angular directions corresponding to view directions of the different views;
a light guide configured to guide light as guided light; and
an array of fluorescent multibeam elements, a fluorescent multibeam element of the element array comprising a fluorescent material and being configured to provide emitted light from the guided light, the emitted light having a color-tailored emission pattern and comprising the plurality of directional light beams,
wherein the color-tailored emission pattern corresponds to an arrangement of color sub-pixels of a view pixel in the view pixel plurality;
wherein the fluorescent multibeam element comprises a plurality of multibeam sub-elements having different fluorescent emission colors from one another; and
wherein the plurality of multibeam sub-elements includes two multibeam sub-elements that overlap in adjacent regions of the two multibeam sub-elements.

16. The multiview display of claim 15, wherein each of the multibeam sub-elements comprises a different fluorescent material from other multibeam sub-elements of the multibeam sub-element plurality to provide the different fluorescent emission colors and the plurality of multibeam sub-elements being arranged to provide the color-tailored emission pattern according to the different fluorescent emission colors.

17. The multiview display of claim 16, wherein a size of the multibeam sub-element is comparable to a size of a view pixel of the view pixel plurality, the multibeam sub-elements being spatially offset from one another by a distance commensurate with a distance between adjacent color sub-pixels of the view pixel.

18. The multiview display of claim 17, wherein the comparable size of the multibeam sub-element is greater than one half of the view pixel size and less than twice the view pixel size.

19. The multiview display of claim 15, wherein the fluorescent material of the fluorescent multibeam element comprises a plurality of fluorescent quantum dots, a fluorescent emission color of the fluorescent material being a function of a size distribution of the fluorescent quantum dots within the fluorescent material.

20. The multiview display of claim 15, further comprising a light source configured to provide the light to the light guide as the guided light, the provided light comprising one or both of blue light and ultraviolet light.

21. The multiview display of claim 15, wherein the multiview pixel of the multiview pixel array comprises a set of light valves, a view pixel of the multiview pixel comprising a plurality of light valves of the set corresponding to the color sub-pixels of the view pixel.

22. A method of multiview backlight operation, the method comprising:
   guiding light along a length of a light guide; and
   emitting light by fluorescent emission from the guided light using an array of fluorescent multibeam elements, the emitted light comprising a plurality of directional light beams having different principal angular directions corresponding to respective different view directions of a multiview display, a fluorescent multibeam element of the array comprising fluorescent material and having a color-tailored emission pattern,
   wherein the color-tailored emission pattern corresponds to an arrangement of color sub-pixels of a view pixel in the multiview display;
   wherein the fluorescent multibeam element comprises a plurality of multibeam sub-elements having different fluorescent emission colors from one another; and
   wherein the plurality of multibeam sub-elements includes two multibeam sub-elements that overlap in adjacent regions of the two multibeam sub-elements.

23. The method of multiview backlight operation of claim 22, wherein the plurality of multibeam sub-elements are spatially offset from one another by a distance corresponding to a distance between the color sub-pixels, the fluorescent material within a multibeam sub-element emitting a different color of emitted light from other multibeam sub-elements of fluorescent multibeam element to provide the color-tailored emission pattern from the guided light.

24. The method of multiview backlight operation of claim 22, further comprising providing light to the light guide using a light source, the provided light comprising one or both of blue light and ultraviolet light that is guided within the light guide as the guided light.

25. The method of multiview backlight operation of claim 22, further comprising modulating the plurality of directional light beams of the emitted light using a plurality of light valves configured as a multiview pixel of the multiview display, a light valve of the light valve plurality corresponding to the color sub-pixel of a view pixel within the multiview pixel.

* * * * *